United States Patent [19]

[11] 4,020,210

Geer

[45] Apr. 26, 1977

[54] ENCAPSULATED WATER PAPER

[75] Inventor: Loren E. Geer, Webster, N.Y.

[73] Assignee: Xerox Corporation, Stamford, Conn.

[22] Filed: Dec. 15, 1975

[21] Appl. No.: 640,603

[52] U.S. Cl. .................................. 428/307; 96/1 R; 162/138; 252/316; 427/145; 428/323; 428/326; 428/327; 428/913

[51] Int. Cl.[2] ...................... B32B 5/16; B32B 27/14

[58] Field of Search .......... 428/199, 326, 307, 327, 428/913, 914, 323, 1 R; 96/85, 14, 18; 252/316; 162/135, 138; 427/152, 145

[56] References Cited

UNITED STATES PATENTS

| | | | |
|---|---|---|---|
| 3,116,147 | 12/1963 | Uber et al. | 96/1.8 |
| 3,516,846 | 6/1970 | Matson | 252/316 |
| 3,578,482 | 5/1971 | Whitaker et al. | 428/913 |
| 3,645,911 | 2/1972 | Van Besauw | 252/316 |
| 3,691,090 | 9/1972 | Kitajima | 252/316 |
| 3,884,685 | 5/1975 | Green Jr. et al. | 96/1.4 |

*Primary Examiner*—George F. Lesmes
*Assistant Examiner*—P. J. Thibodeau
*Attorney, Agent, or Firm*—James J. Ralabate; James P. O'Sullivan; Jerome L. Jeffers

[57] ABSTRACT

Disclosed is a novel paper sheet adapted for the electrostatographic reproduction of images on both sides thereof. The paper bears a surface sizing material having dispersed therein a plurality of microcapsules comprising water or a hydrated salt encased in an impervious capsule wall of a solid material. As the paper is subjected to the electrostatographic fusing operation, water is released from the microcapsules to replenish that lost due to the heat of fusing. In this manner, the paper can be imaged on its other side without encountering the problems associated with dehydration of the paper.

11 Claims, No Drawings

ENCAPSULATED WATER PAPER

BACKGROUND OF THE INVENTION

The art of xerography, as originally disclosed by C. F. Carlson in U.S. Pat. No. 2,297,691, involves the uniform electrostatic charging of a plate comprising a conductive substrate having a uniform layer on its surface of a photoconductive material. Exposure of the charged surface to activating radiation in imagewise configuration causes the photoconductive material to become conductive in the irradiated areas whereby the charge is selectively dissipated leaving a latent electrostatic image corresponding to the non-exposed areas. The latent image is developed by contacting it with a particulate electroscopic marking material known as toner. In plain paper xerography, toner is transferred from the developed plate by contacting it with a sheet of paper which is subjected to an electrostatic charge opposite to that of the toner particles to thereby transfer at least part of the toner from the plate to the paper. After transfer, the toner is thermally fused into the paper to provide a permanent image. It is necessary in the toner transfer operation that the paper have a resistivity no greater than about $10^{13}$ ohms-cm. Paper having lower conductivity is likely to provide a poor copy, since it is necessary for a sheet adapted to the electrostatic reproduction of images to be an electrical conductor at the time the electrostatic charge is imposed on it prior to toner transfer. This requirement is a source of some difficulty in securing satisfactory performance with electrostatographic reproduction papers under different climatic conditions. It is also a source of difficulty in the use of certain papers with various types of copiers in which the paper sheets are automatically processed under conditions in which they are exposed to somewhat elevated tempertures in a dry atmosphere before and during the transfer of toner from the plate to the paper. When the paper is extremely dry, it will not properly accept the toner and to perform properly must contain at least about 2 percent by weight of water. Many theories as to the mechanism by which papers conduct electricity have been advanced but there is no generally accepted theory. It is, however, known that the electrical conductivity of the paper is dependent on its moisture content and upon the distribution of the moisture through the fiber structure, and that the conductivity is extremely sensitive to changes in the moisture content of the paper.

The addition of hydrated salts to paper to improve its conductivity is disclosed in U.S. Pat. No. 3,116,147. This patent discloses the addition of hydrated salts such as $CaCl_2.6H_2O$, $K_2CO_3.2H_2O$ and $LiCl.H_2O$ to paper to improve its conductivity under dry conditions. The use of a hydrated salt by itself is not a complete solution to the conductivity problem encountered during the copying procedure since the paper's conductivity is still somewhat humidity dependent. In addition, the deliquescent nature of many hydrates can result in over saturation of the paper under conditions of high humidity.

The problems encountered relating to paper dryness are especially noticeable in situations where copies are made in the duplex mode, i.e. where images are produced on both sides of the paper. Copying in the duplex mode causes problems in terms of low paper conductivity because the first fusing step drys the paper and renders it relatively non-conductive before it is subjected to the second copying procedure. This may occur even when the paper contains a hydrated salt since the salt will tend to lose its water of hydration at the temperature encountered during the first fusing step.

It would be desirable, and it is an object of the present invention, to provide a novel paper for use in electrostatographic copying.

A further object is to provide such a paper which provides improved performance in terms of reduced scorching and toner disturbances during the copying process.

An additional object is to provide such a paper which is especially adaptable to copying in the duplex mode.

SUMMARY OF THE INVENTION

The present invention is a paper sheet adapted for the electrostatographic reproduction of images on both sides thereof. The electrostatographic image is formed by the deposition of toner particles onto the sheet in imagewise configuration and fusing the toner into the sheet by the application of heat and pressure thereto.

The sheet bears a surface sizing material having dispersed therein a multiplicity of microcapsules which microcapsules comprise water or a hydrated salt encased in an impervious capsule wall of a solid material capable of being ruptured by the heat and pressure applied to the sheet during the fusing of the image formed on the first side thereof.

DETAILED DESCRIPTION

The microcapsules employed in the present invention comprise a nucleus and a wall material. The nucleus, which typically accounts for 70–90 percent by weight of the microcapsule, is either free water or a water containing, i.e. hydrated, salt. Hydrated salts are chemical compounds composed of water molecules loosely bound, in definite weight proportions, to either the cation or anion segment of the salt. Many of the physical properties of such salts suggest some variation in the nature of the chemical bond with the coordinate covalent type being more prevalent. Typical hydrates suitable for use in the present invention are those of the common, less expensive salts. Generally, the salt should be white or colorless in appearance and sufficiently non-toxic so as to comply with standards of industrial safety, thus hydrates of mercury containing salts would not normally be used. Both organic and inorganic hydrates can be employed provided that the salt selected is inert to paper. Preferred salts are those which release their water of hydration at a relatively low temperature, since temperatures above about 400° F at the paper/-fuser interface will tend to scorch the paper. Thus, hydrates which give up their water of hydration at temperatures no greater than about 300° F are particularly desirable. Typical hydrated salts which may be employed include lithium chloride monohydrate, calcium chloride hexahydrate, zinc nitrate hexahydrate, potassium carbonate dihydrate, copper sulfate pentahydrate, magnesium sulfate heptahydrate, zinc sulfate heptahydrate, sodium tetraborate decahydrate, sodium sulfite heptahydrate, sodium sulfate decahydrate, barium hydroxide octahydrate, magnesium acetate tetrahydrate and magnesium nitrate hexahydrate. The heptahydrates of magnesium sulfate and zinc sulfate and the decahydrate of sodium tetraborate are particularly useful.

Any substance which can be deposited around the nucleus and will rupture upon being subjected to the heat and pressure of the fusing operation can be considered a candidate wall material. Suitable wall materials include, for example, gelatin, ethyl cellulose, poly(methyl methacrylate), starches, carboxymethylcellulose, rosin, paraffin, tristearin, poly(vinyl alcohol), polyethylene, polypropylene, polystyrene, polyacrylamides, polyethers, polyesters, polyamides, polybutadiene, polyisoprene, silicones, epoxies and polyurethanes. Of course, when uncombined water is the core material, the wall must be of a water insoluble material.

The desirable wall strength will depend on the amount of heat and pressure to be applied during a particular fusing operation. Wall strength can be controlled over a wide range by several means, including selection of wall thickness, use of additives such as fillers or plasticizers and after treatment of the wall by chemical or physical means. Low permeability of the wall material is important in order to insure adequate shelf life of the paper sheet containing the microcapsules. When water is the nucleus material, wall impermeability is, of course, more essential than is the case when a hydrated salt is employed. Encapsulation of the nucleus material is accomplished by appropriate chemical or physical means, depending on the particular nucleus and wall material selected, which means will be apparent to those skilled in the microencapsulation art.

The size of the microcapsules to be incorporated into the paper sheet will vary over a range of from about 5 to 80 $\mu$ in diameter with a diameter range of from about 20 to 30 $\mu$ being preferred. Selection of an appropriate microcapsule diameter will depend, to some extent, on the surface properties and caliper desired for the finished paper sheet.

The microcapsules are added to the base paper sheet in combination with a surface size. Typically the particles are combined with a binder material and applied to the paper surface in the conventional fashion. The particular binder to be used in the surface sizing composition is not critical to the electrophotographic copy paper of the instant invention. Accordingly, any commercially available binder products conventionally used in surface sizing compositions may be used. Typical binders include starch, starch derivatives, polyvinyl alcohol, polystyrene and mixtures thereof. Because of its anti-scorch properties, polystyrene latex is a particularly useful binder in the sizing formulation.

In addition to the binder and microcapsules, the sizing formulation will normally contain a surface coating such as, for example, a coating clay. Any type of coating material known to those skilled in the art may be used within the purview of the present invention. Typically, the coating material will be present in a weight ratio of from 10:1 to 3:1 of the binder material. The binder and coating material will normally comprise the majority of the composition with the microcapsules accounting for the remainder. The concentration of microcapsules will, of course, depend on the amount of moisture required. The surface size containing the microcapsules is applied to the paper surface in the normal manner. Only very minimal calendering can be employed after application of the surface size lest the microcapsules be broken during the calendering operation.

After its preparation, the paper can be imaged in the conventional electrostatographic manner. As previously mentioned, this process involves the fusing of toner particles into the paper by the application of heat and pressure thereto. In the fusing operation, the paper sheet is typically directed into the nip between two rollers, one of which is heated. In this step, the individual toner particles bourne by the paper soften and coalesce so that they become sticky or tackified and readily adhere to the surface of the paper. In order for the toner to become tackified, there is necessarily a flowing together of the particles to effect a thorough fusion thereof. However, the extent of such flowing should not be sufficient to extend beyond the boundary of the pattern in which the toner particles are formed. In order to fuse toner images it is usually necessary to heat the toner to a relatively high temperature, e.g. 350 to 400° F. The temperature is not normally substantially above 400° F because of the tendency of paper to discolor at such elevated temperatures. Once the toner is tackified, it will adhere to the surface of the paper. The application of pressure to the tackified toner, such as by applying force to the fuser rolls normal to the plane of the paper, causes the tackified toner to penetrate the surface of the paper and become permanently bonded thereto.

When copies are made in the duplex mode, the sheet bearing an image on one side thereof is inverted and subjected to the same process on its other side. However, the sheet having once been subjected to the high temperatures of the fusing step is often dried out to a point such that the previously mentioned problems are encountered during the second imaging. The paper of the instant invention is designed to correct this problem.

Moisture is added to the paper during the first fusing due to the rupturing of the microcapsules by the heat and pressure applied to the paper during this operation. When water is contained in the microcapsules, it is released directly into the paper. In those cases where the nucleus material is a hydrated salt, the heat of fusing causes the salt to liberate its water of hydration. Typically, sufficient microcapsules are included in the paper to provide sufficient water upon its release to provide about 2 percent water by weight of the paper. Since some of the released water may be vaporized during the first fusing, sufficient microcapules to provide a water concentration of up to about 6 percent or more may be incorporated into the paper. The paper of this invention will contain adequate moisture after the first fusing operation and copies can readily be made on the reverse side thereof.

The method of practicing the present invention is further illustrated by the following example.

EXAMPLE 1

A surface size composition is prepared by mixing starch and 25 $\mu$ diameter microcapsules containing magnesium sulfate heptahydrate encapsulated in a 2 $\mu$ thick wall of gelatin in an aqueous dispersion. In addition to the starch and microcapsules, a standard coating clay is provided in an amount such that the ratio of clay to starch is 7:1 on a weight basis.

A typical bond paper substrate is selected which comprises a 100% chemically bleached mixed hardwood/softwood paper. The sizing material is applied to both sides of the paper sheet with an air knife/trailing blade coating device and dried. Sufficient sizing material is applied to provide water in an amount of 6 weight percent of the paper sheet upon release of 6 molecules of water per molecule of the hydrated salt.

The coated paper is imaged in the normal xerographic mode and the toner fused into the paper by the application of heat and pressure. The fuser roll provides sufficient heat to raise the paper surface temperature to about 350° F and simultaneously applies sufficient pressure to rupture the microcapsules. The gelatin capsule wall is ruptured by the fusing operation and water molecules of the hydrate are thermally liberated. Sufficient released water is absorbed and retained by the paper fibers to maintain at least about 2 weight percent water in the paper sheet after the fusing operation. The paper is again subjected to the xerographic operation on its reverse side. Problems related to dehydration of the paper, such as curl and toner disturbances, are significantly reduced by use of the paper of the invention as compared to the use of ordinary paper.

What is claimed is:

1. In a paper sheet adapted for the electrostatographic reproduction of images on both sides thereof by the deposition on its surface of toner particles in imagewise configuration and fusing the toner into the sheet by the application of heat and pressure thereto, the improvement which comprises a surface size on one or both sides of said sheet, said surface size comprising a binder material and a plurality of microcapsules which comprise a core of water or hydrated salt encased in an impervious capsule wall of a solid material capable of being ruptured by the heat and pressure applied to the sheet during the fusing of the image formed on the first side thereof and in the situation where a hydrated salt is employed as the microcapsule core the salt is selected from those hydrates which give up their water of hydration at a temperature equal to or below that to which the paper is subjected during the fusing operation, said microcapsules being present in an amount which will release sufficient water into the paper sheet so as to provide about two percent water by weight of the paper sheet after the fusing of the image formed on the first side thereof.

2. The paper sheet of claim 1 wherein the core of the microcapsule contains a hydrated salt.

3. The paper sheet of claim 2 wherein the hydrated salt is lithium chloride monohydrate, calcium chloride hexahydrate, zinc nitrate hexahydrate, potassium carbonate dihydrate, copper sulfate pentahydrate, magnesium sulfate heptahydrate, zinc sulfate heptahydrate, sodium tetraborate decahydrate, sodium sulfite heptahydrate, sodium sulfate decahydrate, barium hydroxide octahydrate, magnesium acetate tetrahydrate and magnesium nitrate hexahydrate.

4. The paper sheet of claim 3 wherein the hydrated salt is the heptahydrate of magnesium sulfate, the heptahydrate of zinc sulfate or the decahydrate of sodium tetraborate.

5. The paper sheet of claim 1 wherein the wall material of the microcapsule is gelatin, ethyl cellulose, poly(methyl methacrylate), starches, carboxymethylcellulose, rosin, paraffin, tristearin, poly(vinyl alcohol), polyethylene, polypropylene, polystyrene, polyacrylamides, polyethers, polyesters, polyamides, polybutadiene, polyisoprene, silicones, epoxies and polyurethanes.

6. The paper sheet of claim 1 wherein the size of the microcapsules is from 5 to 80 $\mu$ in diameter.

7. The paper sheet of claim 6 wherein the diameter of the microcapsules is from 20 to 30 $\mu$.

8. The paper sheet of claim 1 wherein the binder material is starch, a starch derivative, polyvinyl alcohol, polystyrene or a mixture thereof.

9. The paper sheet of claim 1 wherein there is present a surface coating material in the surface size.

10. The paper sheet of claim 9 wherein the weight ratio of binder material to surface coating material is from 1:10 to 1:3.

11. The paper sheet of claim 9 wherein the surface coating material is clay.

* * * * *